US005107092A

United States Patent [19]

Masden et al.

[11] Patent Number: 5,107,092

[45] Date of Patent: Apr. 21, 1992

[54] PROCESS AND APPARATUS FOR PLASMA MELT CUTTING UNDER WATER

[75] Inventors: Hans Masden; Hans Häusler, both of Finsterwalde, German Democratic Rep.

[73] Assignee: Kjellberg Elektroden & Maschinen GmbH Finsterwalde, German Democratic Rep.

[21] Appl. No.: 322,082

[22] Filed: Mar. 10, 1989

[30] Foreign Application Priority Data

Mar. 10, 1988 [DD] German Democratic Rep. ... 313537

[51] Int. Cl.[5] .................................... B23K 9/00

[52] U.S. Cl. .......................... 219/121.39; 219/121.51; 219/121.5; 219/121.48

[58] Field of Search ........... 219/121.36, 121.4, 121.39, 219/121.59, 121.48, 121.5, 121.52, 74, 75

[56] References Cited

U.S. PATENT DOCUMENTS 4,087,670 5/1978 Miller ............................ 219/121.39
4,652,725 3/1987 Santen et al. .................... 219/121.5
4,816,637 3/1989 Sanders et al. ................ 219/121.39
4,861,962 8/1989 Sanders et al. ................ 219/121.51

FOREIGN PATENT DOCUMENTS 046608 4/1975 U.S.S.R. .......................... 219/121.5

*Primary Examiner*—Mark H. Paschall
*Attorney, Agent, or Firm*—Schweitzer Cornman & Gross

[57] ABSTRACT

The invention relates to an improvement in a plasma burner having a cathode, said burner being adapted to cutting under a liquid an electrically conducting workpiece, wherein electricity forms an ionized gas plasma are between the cathode and the workpiece, the improvement including a nozzle for emitting under the liquid a cutting plasma arc, and guidance provisions in the nozzle for providing a discharge path for a protective gas hyperbolically to eddy about said cutting plasma arc, wherein the angle between the eddy of protective gas and the surface of the workpiece is from about 30° to about 70°, for displacing the liquid from inside the eddy of the protective gas and the vicinity of the plasma arc.

7 Claims, 1 Drawing Sheet

PROCESS AND APPARATUS FOR PLASMA MELT CUTTING UNDER WATER

FIELD OF THE INVENTION

The present invention relates to a method and apparatus for plasma melt cutting under water of electrically conducting materials, particularly of materials which are difficult or not possible to cut by another method.

BACKGROUND OF THE INVENTION

Various methods are known for the use of plasma melt burners for plasma melt cutting. In some of these procedures the plasma melt cutting burner operates under normal atmospheric conditions ("dry plasma"), or the cutting process takes place under water ("water plasma"). When plasma melt cutting burners are employed under normal atmospheric conditions, the arc between the workpiece and the cathode is restricted through a nozzle to achieve the energy density required for cutting. Plasma melt cutting burners of this type employ a carrier gas for the production of the plasma jet, such as an argonhydrogen mixture, nitrogen, oxygen, or air. High quality cutting can be achieved through this method, with reasonably good utilization of the amount of energy used. However, such burners produce a high noise level, emit a dazzling light, toxic gases, dust as well as vaporized metals.

When the cutting procedure takes place under water the foregoing, hygienically harmful conditions can be avoided. Although water has a detrimental effect on the quality of the cutting process, it absorbs a part of the harmful materials, and reduces the noise level and the intensity of the emitted light.

The principle of water injection was developed for improving the quality of the cut. In these cases water is injected in the nozzle orifice of a plasma melt cutting burner and an additional water curtain is used for reducing harmful materials and light effect.

The injected water evaporates, partially dissociates under the effect of the energy of the plasma jet, and also protectively surrounds the same. During this procedure a rotation of the plasma jet takes place. As a result, the two cut edges which are obtained of dissimlar quality; one cut edge is of good quality, whereas the other is of poor quality. In the case of cutting of shaped parts one must assure that the qualitatively better cut edge is in the formed workpiece.

It is not always possible to have the water provide sufficient protection of the cutting station and the plasam jet. This becomes especially significant when the distance between the plasma burner and the workpiece cannot be maintained constant.

In a different kind of burner a ring-shaped nozzle surrounds the plasma melt cutting burner. The plasma jet here encloses a cylindrical or conical bell shaped water formation. A flow of gas is created within this bell shaped water formation. This impacts conically onto the cutting site and an increased inner pressure is formed within the bell shaped water formation. In this case an amount of gas in the range of from about 0.057 to about 0.566 $m^3$/min is required for maintaining sufficient protection of the plasma arc with increased inner pressure within the bell shaped water formation. This kind of operation requires a costly, complex burner, complicated associated apparatus, and a high degree of servicing.

A substantial drawback of plasma melt cutting burners operating with water is the reduction of the cutting velocity in comparison to operating a dry plasma under otherwise identical circumstances. A plasmatron is described in German Federal Republic published patent application No. 3,514,851. This nozzle is formed so that it enables the simultaneous introduction of inert, oxygen-containing and plasma-forming gas as well as water, and independently from each other. This should reduce the required amount of inert gas. The water which exits the slit-like opening with a twist forms a protective conical water cover of variable shape in front of the nozzle. The exiting water is used mainly for cooling of the heated part of the nozzle. The gases are introduced into the nozzle as a vortex, therefore the plasma jet will rotate.

The conical water umbrella formed by the nozzle enables the reduction of the noise and blinding effect of the light, but provides insufficient protection of the plasma jet from the water in the case of cutting a material under water. A further drawback is the extremely complicated and expensive structure of the nozzle. Furthermore, two different cutting edges are formed due to the rotation of the plasma jet. Also the materials dissolved in the cooling water tend to settle on the surfaces of the parts to be cooled, and this reduces the useful life of these parts.

DESCRIPTION OF THE INVENTION

The object of the present invention is to improve the quality of the cutting process in the case of plasma melt cutting under water, and its technical requirements, and at the same time eliminate undue noise, light effects and the emission of harmful materials in the work place and in the environment.

Accordingly, the objective of the invention is to protect the plasma jet from the unfavorable effect of water by means of a gas eddy which rotates with high velocity around the plasma jet. The centrifugal forces produced by the gas eddy displace the water and prevent its entry into the cutting area of the plasma jet and thus improve the quality of the cut. This takes place even when a slight, variation in distance is maintained between the plasma melt cutting burner and the workpiece.

In accordance with the present invention the foregoing objective is carried out so that the nozzle cap of a plasma melt cutting burner is provided with a cone of from about 60° to about 90°, according to the character of the burner. Gas conduits, are attached to this cone at an angle to the axis of the plasma melt cutting burner, of from about 30° to about 60°. From about 5 to about 20 gas conduits can be suitably employed depending on the size of the plasma melt cutting burner. These can be suitably rods, bores, or grooves that are suitably symmetrically arranged in their respective angular disposition. The gas flows at a high velocity through the gas pipes and past or through gas conducting channels that are defined by the gas conduits which are disposed or formed on the burner cap that is usually screwed on to the burner housing. Thus, depending on the nature of the gas conduit that is employed, it can be at the same time also a gas conducting channel, or the conduit will define the path of the gas, i.e. the gas conducting channel.

The gas tangentially surrounds the plasma jet and thus forms a hyperbolic gas eddy for displacing the surroundig water. The inside diameter of the protective jacket thus formed can be varied from about 1.5 to about 8 mm, according to the amount of gas introduced and its flow velocity, and forms an angle of incidence of from about 30° to about 70° with the surface of the workpiece.

The kinetic energy of all gas jets produces, similarly to a cyclone, a centrifugal effect which displaces the water. The gas flowing through the conically tangential arrangement of the gas conduits and the gas conducting channels formed in the burner cap leaves these as gas jets which prevent the water from contacting the plasma jet without affecting the flow characteristics of the plasma jet itself.

DESCRIPTION OF THE DRAWING

The present invention is disclosed with reference being had to the drawing, wherein.

DESCRIPTION OF PREFERRED EMBODIMENTS

Figure 1:
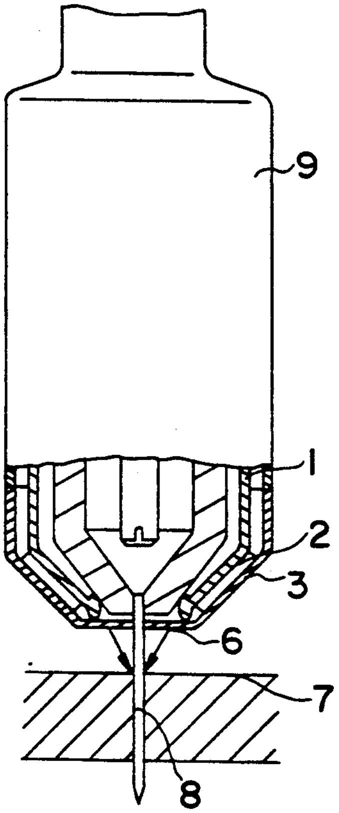
FIG. 1 is a side view of the apparatus according to the invention partially in section.
Figure 2:
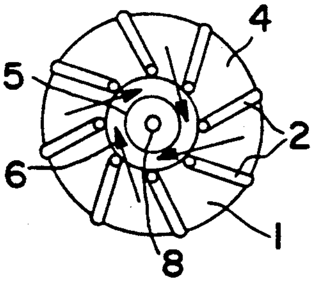
FIG. 2 is a bottom plan view of the gas conduits employed in the apparatus of FIG. 1.

As shown in FIGS. 1–2, a plasma melt cutting burner is provided with a nozzle cap 1. The conically shaped portion of the cap, as is customary in burners, can have an angle of from about 60° to about 90°. From about 5 to about 20 gas conduit rods 2 are arranged on this conical portion, the rods being disposed at an angle of from about 30° to about 60° with respect to the longitudinal axis of the plasma melt cutting burner. A burner cap 3 is suitably screwed into a burner housing 5. The housing 9 and cap 3 are placed over the nozzle cap 1 and the gas conduit rods 2, whereby gas conducting channels 4 are formed between the rods. The gas flows with a high velocity through these gas conducting channels 4. The gas is suitably argon, argon-air mixture, oxygen, or air. The gas exits through a plasma melt cutting burner orifice 5 indicated as gas jets 6.

Due to the arrangement of the gas conduit rods 2 the gas jets 6 approach the plasma jet 8 tangentially in the circle of from about 1.5 to about 8 mm diameter and then contact the surface of the workpiece 7 at an angle of about from 30° to about 70°. The plasma jet 8 is surrounded by the cyclone-like eddy of gas which prevents the water from contacting the plasma jet. This displacement of the water is accomplished not only through the static pressure of the individual gas jets, but primarily through the kinetic energy of the totality of the gas jets.

Figure 3:
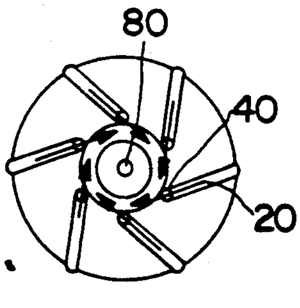
FIGS. 3–4 show various embodiments of the gas conduit arrangements.
Figure 4:
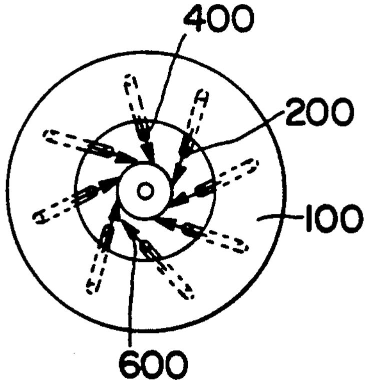

The same principle of operation is achieved by means of the various embodiments shown in FIGS. 3–4. In the embodiment shown in FIG. 3 gas conduits 20 are tubes rather than rods. These are also attached at an angle of from about 30° to about 60° to the longitudinal axis of the plasma melt cutting burner. In this arrangement the gas flows through the tubes 20 with a high velocity to form plasma jets 80. In this embodiment the gas conduits 20 also act as gas conducting channels 40.

In the embodiment shown in FIG. 4 an intermediate piece is inserted between a nozzle cap 100 and a burner cap 300 and from about 5 to about 25 tangential gas conduit bores 200 are drilled into te intermediate piece to serve as gas conducting channels 400. Gas jets 600 are then formed.

According to a further embodiment (not shown) the gas can also be introduced through gas conduit grooves machined into the conical portion of the nozzle cap. These grooves would also be disposed at an angle of from about 30° to about 60° relative to the longitudinal axis of the plasma melt cutting burner. These grooves also serve as the gas conducting channels.

The present invention provides reliable protection of the plasma jet against the penetration of water, even in the case of variation of the distance between the burner and the workpiece during the cutting. This protective result can be achieved by the appropriate arrangements of the gas conduits and the gas conducting channels.

The gas jets impact on the surface of the workpiece with a high velocity. About 0.115 $m^3$/min of gas is required to produced an effective gas eddy. The gas is then diverted by the surface of the workpiece so that the impact point of the plasma jet on the surface of the workpiece is well protected by the surrounding water. This has an especially favorable effect on the quality of the cut edges. Thus, any disadvantageous effects which the gas flow or the water might otherwise have on the plasma jet are avoided.

The gas flow is decomposed into tiny bubbles due to the high rotational velocity of the gas eddy. This assures a more intensive interaction with the water which leads to a more effective absorption of any harmful gaseous materials in the water.

The present invention has the further advantage of enabling the possibility of working under normal atmospheric conditions. The burner housing with the burner cap screwed onto it can be removed or can remain in place, so that these parts do not detrimentally effect the cutting process.

We claim:

1. A plasma burner for cutting an electrically conducting workpiece disposed substantially perpendicularly to the burner, which comprises a cathode for forming a cutting plasma arc under a liquid, said cutting plasma arc being formed between said cathode and the workpiece under the liquid, means for providing a discharge path for a protective gas hyperbolically to eddy in a rotational symmetry about said cutting plasma arc, wherein the angle of incidence of the protective gas and the surface of the workpiece is from about 30° to about 70°, for displacing the liquid from inside the eddy of the protective gas and the vicinity of the plasma arc.

2. The improvement in the plasma burner of claim 1, wherein the liquid is water, and wherein the inside diameter of the eddy of protective gas is variable from about 1.5 mm to about 8 mm.

3. The improvement in the plasma burner of claim 2, wherein said means for providing the discharge path for protective gas, comprises rods, pipes, grooves, or bores.

4. The improvement in the plasma arc burner of claim 3, wherein the burner has a longitudinal axis, and the burner comprises a substantially conical burner orifice cap, and said means for providing the discharge path for the protective gas are disposed on the cone of said burner orifice cap.

5. The improvement in the plasma burner of claim 3, wherein said rods comprise from about 5 to about 20 rods disposed at an inclination of from about 30° to about 60° to said longitudinal axis.

6. The improvement in the plasma burner of claim 3, wherein said pipes comprise from about 5 to about 20 pipes disposed on the cone of said burner orifice cap and being adopted to provide the protective gas eddy.

7. The improvement in the plasma burner of claim 3, wherein said bores comprise from about 5 to about 20 bores disposed about the burner orifice and being adapted to provide the protective gas eddy.

* * * * *